(12) United States Patent
Winberg et al.

(10) Patent No.: US 9,352,785 B2
(45) Date of Patent: May 31, 2016

(54) SUBFRAME CONFIGURED TO DETACH UPON IMPACT

(71) Applicant: Tesla Motors, Inc., Palo Alto, CA (US)

(72) Inventors: N. Petter Winberg, Hayward, CA (US); Michael J Eckert, Fremont, CA (US); Sachin Shrimant Sawant, Newark, CA (US)

(73) Assignee: Tesla Motors, Inc., Palo Alto, CA (US)

(*) Notice: Subject to any disclaimer, the term of this patent is extended or adjusted under 35 U.S.C. 154(b) by 0 days.

(21) Appl. No.: 14/255,907

(22) Filed: Apr. 17, 2014

(65) Prior Publication Data

US 2015/0298741 A1   Oct. 22, 2015

(51) Int. Cl.
| | | |
|---|---|---|
| *B60R 19/26* | (2006.01) | |
| *B62D 21/15* | (2006.01) | |
| *B62D 21/11* | (2006.01) | |

(52) U.S. Cl.
CPC ............. *B62D 21/155* (2013.01); *B62D 21/11* (2013.01)

(58) Field of Classification Search
CPC ............. B60K 1/04; B60K 2001/0438; B62D 21/152; B62D 21/155; B62D 25/20; B62D 25/2018; B62D 25/082; B62D 21/11; B62D 21/15; B62D 21/157; B62D 25/025; B62D 25/087; B62D 25/2027; B62D 25/2036; B60L 11/005; B60L 11/1803; B60L 11/1816; B60L 11/1864; B60L 1/003; B60L 2210/10; B60L 2240/34; B60L 2240/36; B60L 2240/525; B60L 3/003; B60L 3/0061
USPC ............... 280/781, 784; 180/311, 312; 296/187.09, 203.02, 187.1, 193.09, 296/187.12, 193.08, 204

See application file for complete search history.

(56) References Cited

U.S. PATENT DOCUMENTS

| | | | | |
|---|---|---|---|---|
| 4,440,435 | A | * | 4/1984 | Norlin ..................... 296/187.09 |
| 5,738,378 | A | * | 4/1998 | Yazejian ..................... 280/784 |
| 6,923,474 | B2 | * | 8/2005 | Frasch et al. ................. 280/784 |
| 2002/0096384 | A1 | | 7/2002 | Yoshida et al. |
| 2004/0200659 | A1 | | 10/2004 | Miyasaka |
| 2006/0284449 | A1 | * | 12/2006 | Miyahara ..................... 296/204 |
| 2007/0132223 | A1 | * | 6/2007 | Scheffzuek ................... 280/784 |
| 2010/0032983 | A1 | | 2/2010 | Kusaka |
| 2010/0264637 | A1 | | 10/2010 | Kosaka et al. |
| 2011/0285176 | A1 | | 11/2011 | Baccouche et al. |
| 2011/0316295 | A1 | | 12/2011 | Yamada et al. |
| 2012/0056447 | A1 | | 3/2012 | Yoshida |
| 2012/0153718 | A1 | | 6/2012 | Rawlinson et al. |
| 2012/0169089 | A1 | | 7/2012 | Rawlinson et al. |
| 2012/0175897 | A1 | | 7/2012 | Rawlinson et al. |
| 2012/0175898 | A1 | | 7/2012 | Gadhiya et al. |
| 2012/0175899 | A1 | | 7/2012 | Gadhiya et al. |

(Continued)

FOREIGN PATENT DOCUMENTS

| | | | |
|---|---|---|---|
| JP | 3350600 | B2 | 11/2002 |
| JP | 3954709 | B2 | 8/2007 |

(Continued)

*Primary Examiner* — Glenn Dayoan
*Assistant Examiner* — Sunsurraye Westbrook
(74) *Attorney, Agent, or Firm* — J. Richard Soderberg

(57) ABSTRACT

A subframe for a vehicle has a front attachment to a crush rail in the vehicle, and a rear attachment to the vehicle, the subframe comprising at least one initiator configured to cause the subframe to fold downward in event of impact, the subframe configured so that the front attachment detaches as a result of the impact and the subframe is deflected downward, while the rear attachment does not detach.

17 Claims, 3 Drawing Sheets

(56) References Cited

U.S. PATENT DOCUMENTS

| | | |
|---|---|---|
| 2012/0175900 A1 | 7/2012 | Rawlinson |
| 2012/0175916 A1 | 7/2012 | Rawlinson et al. |
| 2013/0088045 A1 | 4/2013 | Charbonneau et al. |
| 2013/0181481 A1 | 7/2013 | Baccouche et al. |
| 2013/0200653 A1 | 8/2013 | Yasui et al. |
| 2013/0238197 A1 | 9/2013 | Faruque et al. |
| 2013/0257028 A1 | 10/2013 | Kuwabara et al. |
| 2013/0270029 A1 | 10/2013 | Young et al. |
| 2013/0270860 A1 | 10/2013 | Young et al. |

FOREIGN PATENT DOCUMENTS

| | | |
|---|---|---|
| JP | 2008056191 A | 3/2008 |
| WO | 2013064270 A1 | 5/2013 |

* cited by examiner

SUBFRAME CONFIGURED TO DETACH UPON IMPACT

BACKGROUND

Vehicles are generally designed with an eye toward the possibility of forceful impact, whether that be the result of the vehicle hitting another stationary or moving object, or due to the vehicle being run into by something (e.g., another vehicle). For this reason, crash-absorbing structures can be provided in the front and rear of the vehicle. One purpose of crash-absorbing structures can be to direct crash forces away from certain areas of the vehicle, such as the passenger compartment or sensitive components, such as an energy storage (e.g., a battery pack or a fuel tank).

SUMMARY

In a first aspect, a subframe for a vehicle has a front attachment to a crush rail in the vehicle, and a rear attachment to the vehicle, the subframe comprising at least one initiator configured to cause the subframe to fold downward in event of impact, the subframe configured so that the front attachment detaches as a result of the impact and the subframe is deflected downward, while the rear attachment does not detach.

Implementations can include any or all of the following features. The front attachment comprises first and second front nodes attached to the crush rail, and first and second rear nodes attached to the vehicle. The first and second front and rear nodes are cast. At least one of the first and second front nodes is configured to break as a result of the impact, thereby detaching the front attachment. The first and second front nodes each has a respective member extending forward, wherein the subframe is configured to receive the impact at least in part through the respective members. The subframe further includes a front transverse member connecting the first and second front nodes to each other, and a rear transverse member connecting the first and second rear nodes to each other. Each of the first and second front and rear nodes has at least one slot, the slot configured for receiving different longitudinal members to adapt the subframe to a particular size of the vehicle. The subframe further includes first and second longitudinal members connecting the front and rear attachments to each other, each of the first and second longitudinal members having at least one initiator facilitating a downward folding of the first or second longitudinal member as a result of the impact. At least one of the first and second longitudinal members has a first initiator on top thereof adjacent the front attachment, and a second initiator on a bottom thereof adjacent the rear attachment. Each of the first and second initiators comprises a swage. The downward folding of the first or second longitudinal member comprises folding into a Z-shape. The first and second longitudinal members are extruded. The first and second longitudinal members are welded to respective nodes that form the front and rear attachments. The front attachment comprises at least a first bolt configured to break as a result of the impact, thereby detaching the front attachment. The rear attachment comprises at least a second bolt that attaches the subframe to a torque box of the vehicle, or to an adapter for the torque box. The second bolt is sturdier than the first bolt and is thereby configured to not break as a result of the impact. The subframe is configured so that the folding downward of the subframe, and the deflection downward of the subframe, occur at least in part simultaneously.

DETAILED DESCRIPTION

This document describes examples of systems and techniques for removing certain vehicle components and other structures out of a crash load path in the event of impact. A subframe that is positioned at the vehicle front end and that has the component(s) or other structure mounted thereon can be configured so that its front part de-attaches in response to impact, allowing the subframe to deflect by folding downward. The rear part of the subframe, on the other hand, is configured to remain attached (in a typical crash scenario). This functionality can help prevent that the crash forces push a steering rack (or other component) into the body of the vehicle, where it can do significantly more damage. For example, a motor mounted at the front of the vehicle could be struck by the steering rack and cause a more severe crash pulse as the components stack up against each other, which can lead to higher occupant injuries or increased damage to the vehicle, for example in an energy storage (e.g., a battery pack).

Figure 1:
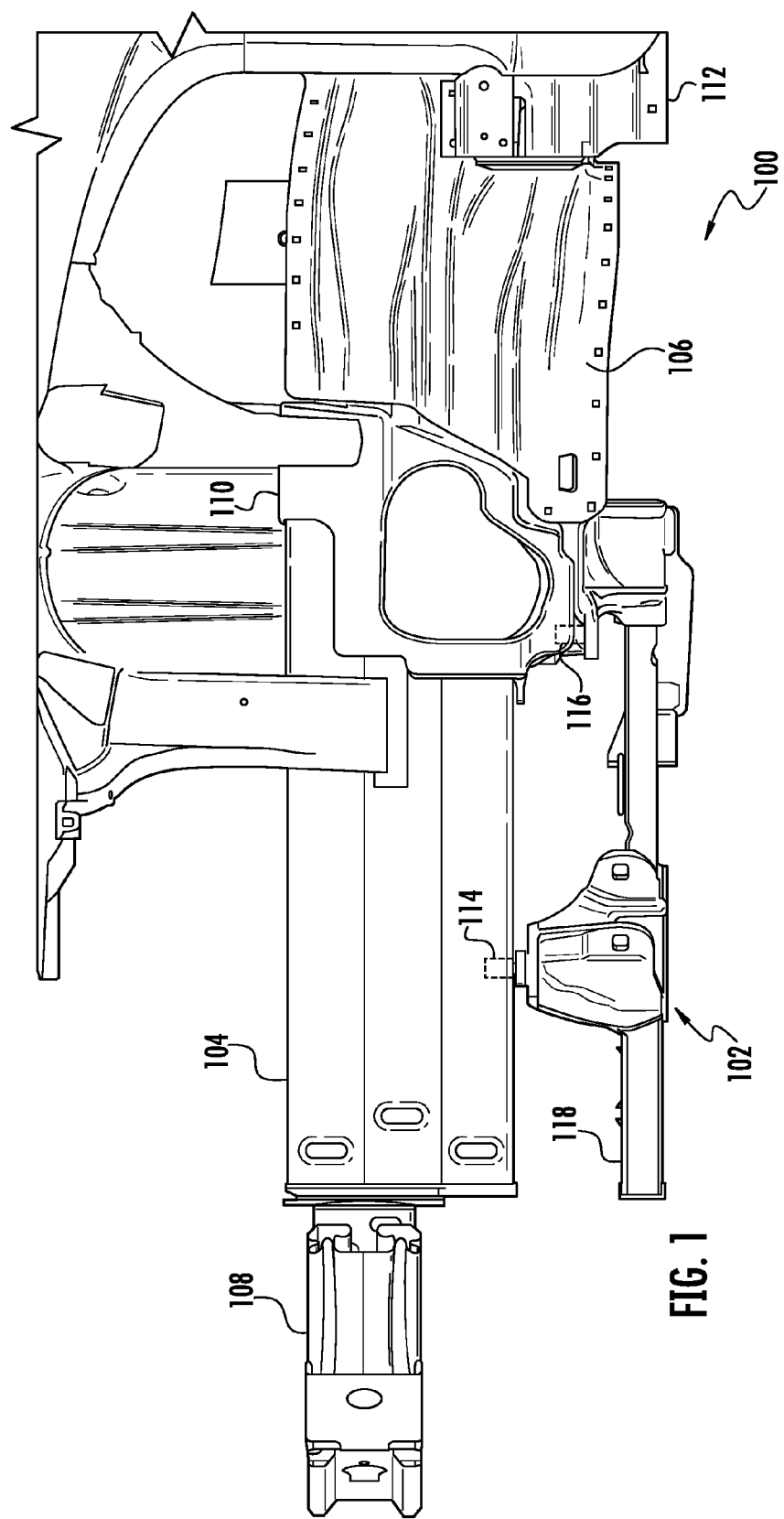
FIG. 1 shows a side view of an example of a vehicle front end with a subframe.

FIG. 1 shows a side view of an example of a vehicle front end 100 with a subframe 102. Here, the vehicle front end also has a crush rail 104 and a torque box 106. A bumper system 108 is mounted on a front end of the crush rail, and the rear end of the crush rail is mounted in an adapter 110 that is also fitted into the torque box. The other side of the vehicle can have a corresponding set of these components. That is, the bumper system 108 can there be attached to another crush rail, which in turn has its respective adapter and torque box, which are not shown here for simplicity.

Upon impact on the bumper system, the crush rail is configured to at least partially collapse (e.g., fold in a regular pattern) and absorb some of the crash load. remaining crash force is then conveyed into the adapter, which can be partially deformed or crushed as a result, while transferring some of the energy into the torque box. The torque box serves to redirect the crash load (e.g., in a lateral direction) into another part of the vehicle frame, for example a side sill 112.

The front of the subframe is attached to the crush rail 104, for example by one or more bolts 114. The rear of the subframe is here attached to the adapter 110 and to the torque box 106. For example, the rear can be attached by one or more bolts 116. Here, the subframe also has members 118 extending forward in the vehicle. For example, the far end of the members 118 can be substantially lined up with the front end of the crush rail 104. That is, in the event of a crash, the subframe can receive the impact at least in part through the respective members 118.

Figure 2:
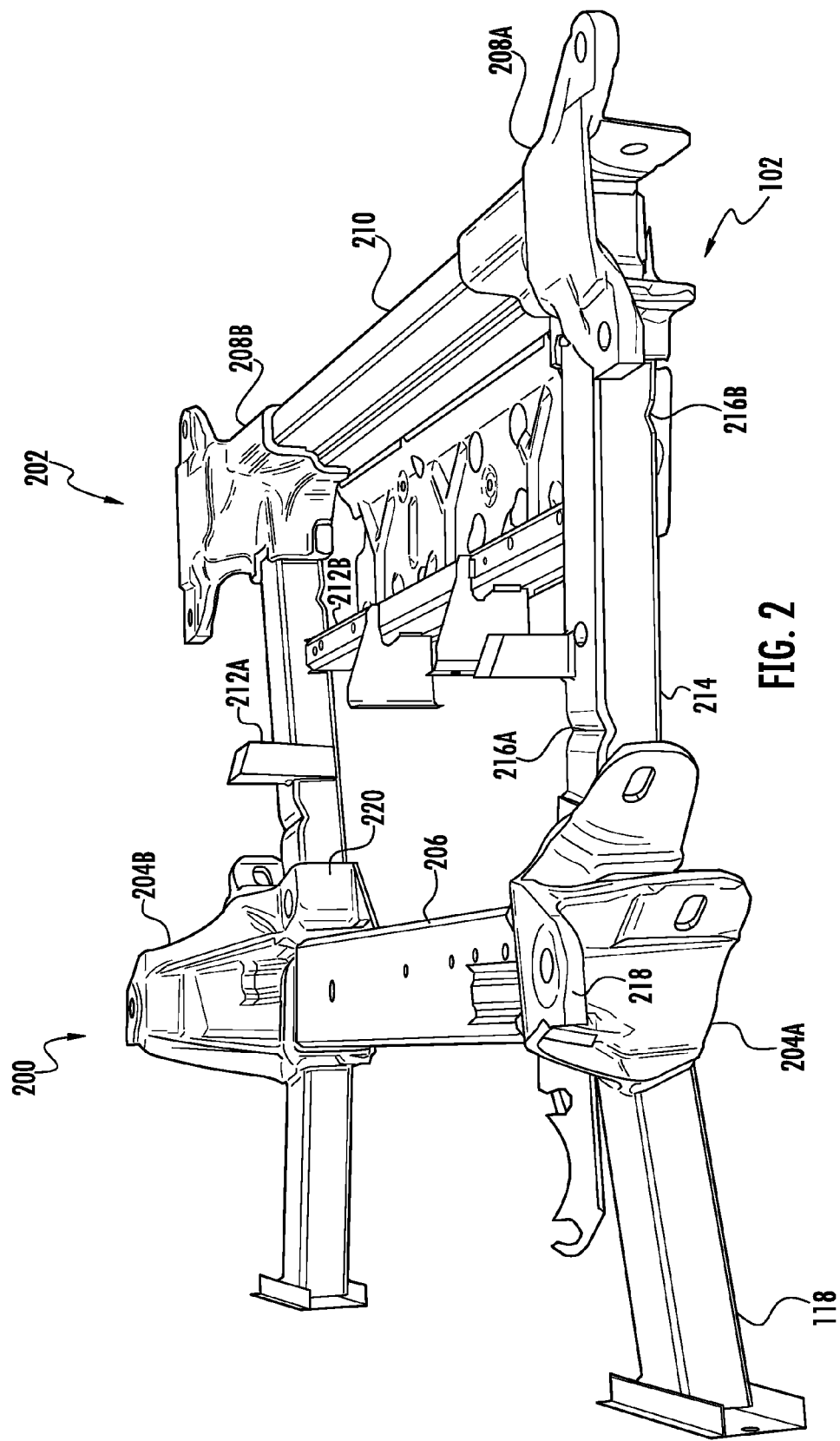
FIG. 2 shows a perspective view of the subframe of FIG. 1.

FIG. 2 shows a perspective view of the subframe 102 of FIG. 1. The subframe has a front attachment 200 and a rear attachment 202. For example, the front attachment allows the subframe to be suspended from the crush rail 104 (FIG. 1); the rear attachment allows the subframe to be suspended from the adapter 110 and/or the torque box 106 (FIG. 1). The subframe also has the members 118 extending forward.

The front attachment 200 here includes front nodes 204A-B that can be attached to respective crush rails, and a member 206 connecting the front nodes. In some implementations, the front nodes are made of aluminum. For example, the front nodes can be cast.

The rear attachment 202 here includes rear nodes 208A-B that can be attached to respective adapters/torque boxes, and a member 210 connecting the rear nodes. In some implementations, the rear nodes are made of aluminum. For example, the rear nodes can be cast.

The subframe 102 can also have support structure for mounting components onto the subframe. For example, a structure 212A can be used for supporting a steering rack. As another example, a structure 212B can be used for holding a compressor and a pump.

The subframe 102 has a pair of members 214 that connect the front attachment 200 and the rear attachment 202 to each other. The members 206, the members 214 and/or the members 118 can be manufactured in any suitable way. In some implementations, the member(s) can be made by extrusion. For example, the member(s) can be made from aluminum.

Each of the members 214 can have one or more initiators. In some implementations, an initiator can comprise an indentation, a swage, a removal of material, presence of a different material, a weakening of material, or combinations of two or more such features. For example, in an extruded member that generally has a square or rectangular cross-section profile, an initiator can be a substantially V-shaped indentation on at least one face thereof.

Here, the member 214 has an initiator 216A on its top surface, and an initiator 216B on its bottom surface. The initiator 216A is closer to the front node 204A than to the rear node 208A, whereas the initiator 216B is closer to the rear node 204B than to the front node 204A.

In the event of impact, the initiator(s) will help the subframe 102 deflect by triggering it to fold downward. Here, the initiator 216A will receive the crash load before the initiator 216B. Accordingly, the member can begin folding near the position of the initiator 216A. The subframe will also begin folding near the position of the initiator 216B. The relative positions of the initiators can approximately determine the shapes that the subframe assumes during and after the folding.

The impact energy also causes the front attachment 200 of the subframe 102 to detach from the rest of the vehicle (e.g., from a crush rail). With reference again briefly to FIG. 1, the bolt 114 can be configured so that it breaks when subjected to sufficient force. For example, the bolt can be made from a material of a particular strength, and/or it can have a certain dimension, that allows it to break upon the typical level of impact force. In addition to, or instead of, the bolt breaking, some other part of the front attachment 200 can give way. For example, seat 218 can experience ultimate strength failure of surrounding material due to impact forces, resulting in separation of frame from body at this attachment point.

The rear attachment 202, on the other hand, is configured so as to not de-attach from the rest of the vehicle in a typical crash scenario. This can be accomplished by making this attachment stronger than the one in front. For example, the bolt(s) 116 can be made of a stronger material, and/or with greater dimensions, than the front one(s).

The subframe 102 can have some components that are usable with multiple different types of vehicles, and this can be considered a tunable aspect of the subframe. In some implementations, the manufacturing process is simplified by making the nodes 204A-B and 208A-B from castings, and attaching linear extrusions to them (e.g., the members 118, 206 and 214). Particularly, a node can have one or more slots 220 configured for receiving ends of such extrusions, which can then be welded in place. The same slot(s) can be used with extrusions of different length, for creating subframes that are adapted to vehicles having different size and/or other characteristics.

Figure 3:
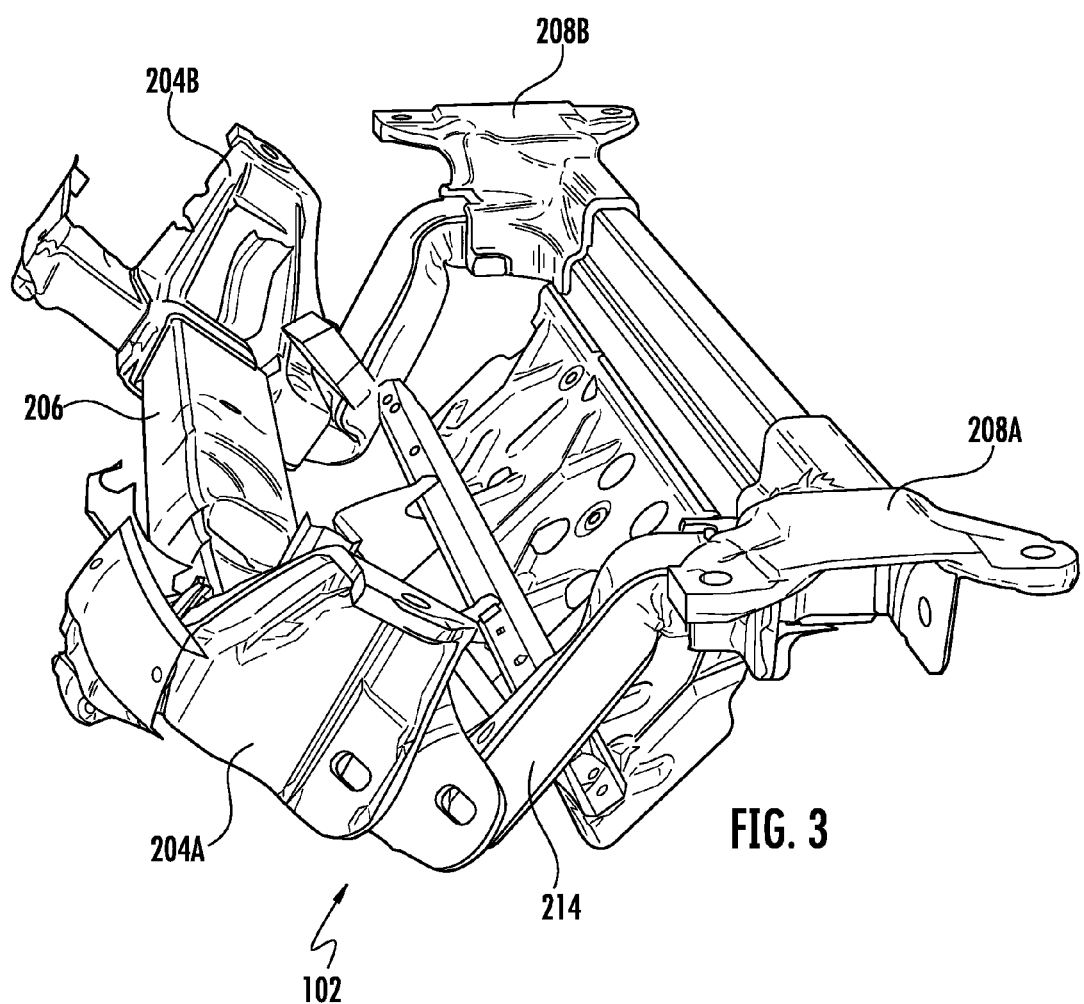
FIG. 3 shows an example of the subframe of FIG. 1 in a deformed state.

FIG. 3 shows an example of the subframe 102 of FIG. 1 in a deformed state. Particularly, the front nodes 204A-B are visible, as are the rear nodes 208A-B. The nodes remain attached to the member 214 which is significantly deformed. Particularly, the subframe has entered the deformed state as a result of the folding of the subframe and its deflection downward from the vehicle, which can occur at least partially at the same time. In this example, the member 214 has undergone a deformation, triggered by initiators, that involved folding the member similar to a Z-shape.

A number of implementations have been described as examples. Nevertheless, other implementations are covered by the following claims.

What is claimed is:

1. A subframe for a vehicle, the subframe having a front attachment to a crush rail in the vehicle, and a rear attachment to the vehicle, the subframe comprising at least one initiator configured to cause the subframe to fold downward in event of impact, the subframe configured so that the front attachment detaches as a result of the impact and the subframe is deflected downward, while the rear attachment does not detach.

2. The subframe of claim 1, wherein the front attachment comprises first and second front nodes attached to the crush rail, and wherein the rear attachment comprises first and second rear nodes attached to the vehicle.

3. The subframe of claim 2, wherein the first and second front and rear nodes are cast.

4. The subframe of claim 2, wherein at least one of the first and second front nodes is configured to break as a result of the impact, thereby detaching the front attachment.

5. The subframe of claim 2, wherein the first and second front nodes each has a respective member extending forward, wherein the subframe is configured to receive the impact at least in part through the respective members.

6. The subframe of claim 2, further comprising a front transverse member connecting the first and second front nodes to each other, and a rear transverse member connecting the first and second rear nodes to each other.

7. The subframe of claim 2, wherein each of the first and second front and rear nodes has at least one slot, the slot configured for receiving different longitudinal members to adapt the subframe to a particular size of the vehicle.

8. The subframe of claim 1, further comprising first and second longitudinal members connecting the front and rear attachments to each other, each of the first and second longitudinal members having at least one initiator facilitating a downward folding of the first or second longitudinal member as a result of the impact.

9. The subframe of claim 8, wherein at least one of the first and second longitudinal members has a first initiator on top thereof adjacent the front attachment, and a second initiator on a bottom thereof adjacent the rear attachment.

10. The subframe of claim 9, wherein each of the first and second initiators comprises a swage.

11. The subframe of claim 8, wherein the downward folding of the first or second longitudinal member comprises folding into a Z-shape.

12. The subframe of claim 8, wherein the first and second longitudinal members are extruded.

13. The subframe of claim 12, wherein the first and second longitudinal members are welded to respective nodes that form the front and rear attachments.

14. The subframe of claim 1, wherein the front attachment comprises at least a first bolt configured to break as a result of the impact, thereby detaching the front attachment.

15. The subframe of claim 14, wherein the rear attachment comprises at least a second bolt that attaches the subframe to a torque box of the vehicle, or to an adapter for the torque box.

16. The subframe of claim 15, wherein the second bolt is sturdier than the first bolt and is thereby configured to not break as a result of the impact.

17. The subframe of claim 1, wherein the subframe is configured so that the folding downward of the subframe, and the deflection downward of the subframe, occur at least in part simultaneously.

* * * * *